US011328053B2

(12) United States Patent
Bengtson (10) Patent No.: US 11,328,053 B2
(45) Date of Patent: May 10, 2022

(54) ADVANCED METADATA PROXY

(71) Applicant: Netflix, Inc., Los Gatos, CA (US)

(72) Inventor: William Bengtson, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 357 days.

(21) Appl. No.: 16/402,210

(22) Filed: May 2, 2019

(65) Prior Publication Data

US 2019/0349405 A1 Nov. 14, 2019

Related U.S. Application Data (60) Provisional application No. 62/756,460, filed on Nov. 6, 2018, provisional application No. 62/669,313, filed on May 9, 2018.

(51) Int. Cl.
*G06F 21/45* (2013.01)
*H04L 67/51* (2022.01)
(Continued)

(52) U.S. Cl.
CPC .......... *G06F 21/45* (2013.01); *H04L 63/0281* (2013.01); *H04L 63/0823* (2013.01);
(Continued)

(58) Field of Classification Search
None
See application file for complete search history.

(56) References Cited

U.S. PATENT DOCUMENTS 7,219,142 B1 * 5/2007 Parekh ................ H04L 41/0893
709/223
7,453,852 B2 11/2008 Buddhikot et al.
(Continued)

FOREIGN PATENT DOCUMENTS

CA 3 097 671 A1 11/2019
WO 2019/217595 A1 11/2019

OTHER PUBLICATIONS

"Network Monitoring using MMT: An application based on the User-Agent field in HTTP headers", La et al., 2016 IEEE 30th International Conference on Advanced Information Networking and Applications, 2016. (Year: 2016).*
(Continued)

*Primary Examiner* — Tonia L Dollinger
*Assistant Examiner* — Jonathan A Sparks
(74) *Attorney, Agent, or Firm* — FisherBroyles, LLP (57) ABSTRACT

The disclosed computer-implemented method may include establishing a header policy that is to be applied at a metadata proxy. The header policy may indicate that specified header information is to be included in each metadata service request sent to a metadata service. The method may also include accessing the established header policy at the metadata proxy, where the metadata proxy is configured to intercept metadata service requests and check the intercepted requests for the specified header information. The method may further include determining, at the metadata proxy, that the metadata service request does not include the specified header information and, in response to the determination, preventing the metadata service request from being passed to the metadata service. Various other methods, systems, and computer-readable media are also disclosed.

20 Claims, 5 Drawing Sheets

(51) Int. Cl.
*H04L 67/566* (2022.01)
*H04L 29/06* (2006.01)
*H04L 9/40* (2022.01)

(52) U.S. Cl.
CPC .......... *H04L 63/0876* (2013.01); *H04L 63/10* (2013.01); *H04L 63/1491* (2013.01); *H04L 63/20* (2013.01); *H04L 67/16* (2013.01); *H04L 67/2833* (2013.01); *H04L 63/101* (2013.01)

(56) References Cited

U.S. PATENT DOCUMENTS

| | | | |
|---|---|---|---|
| 8,619,779 | B2 | 12/2013 | Li et al. |
| 8,990,392 | B1 * | 3/2015 | Stamos ............... H04L 41/0893 709/224 |
| 9,288,193 | B1 | 3/2016 | Gryb et al. |
| 9,521,606 | B1 | 12/2016 | Costa et al. |
| 9,882,929 | B1 * | 1/2018 | Ettema ................ H04L 63/1491 |
| 10,298,577 | B1 * | 5/2019 | Aithal .................. H04L 63/126 |
| 10,594,657 | B1 * | 3/2020 | Pisharody ........... H04L 63/0263 |
| 2010/0134299 | A1 | 6/2010 | Fitzgerald et al. |
| 2011/0225234 | A1 * | 9/2011 | Amit ....................... G06F 21/51 709/203 |
| 2012/0042163 | A1 | 2/2012 | Goodman et al. |
| 2012/0173732 | A1 | 7/2012 | Sullivan |
| 2013/0219483 | A1 | 8/2013 | Cho et al. |
| 2014/0082350 | A1 | 3/2014 | Zarfoss, III et al. |
| 2014/0279640 | A1 * | 9/2014 | Moreno .................. G07C 9/22 705/325 |
| 2015/0095497 | A1 | 4/2015 | Caputo et al. |
| 2015/0142968 | A1 | 5/2015 | Bhagwat et al. |
| 2016/0105489 | A1 | 4/2016 | Llorca et al. |
| 2017/0317999 | A1 * | 11/2017 | Knjazihhin ............. H04L 63/08 |
| 2017/0339070 | A1 | 11/2017 | Chang et al. |
| 2017/0339186 | A1 | 11/2017 | Gurvich et al. |
| 2018/0007002 | A1 | 1/2018 | Landgraf |
| 2018/0026944 | A1 * | 1/2018 | Phillips ............... H04L 63/1433 726/4 |
| 2018/0115551 | A1 | 4/2018 | Cole |
| 2018/0316764 | A1 | 11/2018 | Ferreira Gomes et al. |
| 2019/0173880 | A1 * | 6/2019 | Nakhjiri ................ G06F 9/4416 |
| 2019/0182250 | A1 * | 6/2019 | Kiester ............... H04L 63/0428 |
| 2019/0334869 | A1 * | 10/2019 | Grant .................. H04L 61/3025 |
| 2019/0347404 | A1 | 11/2019 | Bengtson |
| 2019/0349369 | A1 | 11/2019 | Bengtson |
| 2020/0053397 | A1 | 2/2020 | Zhou |
| 2020/0106748 | A1 | 4/2020 | Newell et al. |
| 2020/0329011 | A1 * | 10/2020 | Cai ........................ G06F 9/547 |

OTHER PUBLICATIONS

International Search Report and Written Opinion received for PCT Application Serial No. PCT/US2019/031387 dated Jul. 12, 2019, 11 pages.

Bengtson, William, "Multilayered Approach To Protecting Cloud Credentials", U.S. Appl. No. 16/393,958 dated Apr. 25, 2019, 51 pages.

Bengtson et al., "Detecting Credential Compromise In A Cloud Resource", U.S. Appl. No. 16/402,213 dated May 2, 2019, 68 pages.

Non-Final Office Action received for U.S. Appl. No. 16/393,958 dated Nov. 16, 2020, 41 pages.

International Preliminary Report on Patentability received for PCT Application Serial No. PCT/US2019/031387 dated Nov. 19, 2020, 9 pages.

* cited by examiner

ADVANCED METADATA PROXY

CROSS REFERENCE TO RELATED APPLICATION

This application claims priority to and the benefit of U.S. Provisional Patent Application No. 62/756,460, filed Nov. 6, 2018, and also claims priority to U.S. Provisional Patent Application No. 62/669,313, filed May 9, 2018, the disclosures of each of which are incorporated, in their entirety, by this reference.

BACKGROUND

In many cases, software applications are installed locally on electronic devices. In other cases, software applications may be hosted on the cloud and may not be installed locally on the electronic devices, or those devices may only have small, client-side applications that allow access to the cloud. Each of these cloud-hosted applications may be hosted on different cloud instances. These cloud instances are often referred to as "virtual private clouds" or VPCs. Organizations may set up VPCs to host applications for their users. Those users typically log in to the VPCs, providing credentials such as usernames and passwords or biometric information. Once logged in, the users may be able to access data and other resources provided by the cloud-hosted application. In some cases, the user's credentials may be static and may be valid indefinitely. In other cases, the user's credentials may be temporary and may lose their validity after a predefined period (e.g., 1-6 hours). Once the user's credentials have lost their validity, any access to applications hosted on the VPCs will be denied.

SUMMARY

As will be described in greater detail below, the present disclosure describes methods and systems for protecting credentials in a cloud environment by implementing a metadata proxy that looks for specific header information in metadata service requests.

In one example, a computer-implemented method for protecting credentials in a cloud environment may include establishing a header policy that is to be applied at a metadata proxy. The header policy may indicate that specified header information is to be included in each metadata service request sent to a metadata service. The method may also include accessing the established header policy at the metadata proxy. The metadata proxy may be configured to intercept metadata service requests and check the intercepted requests for the specified header information. The method may further include determining, at the metadata proxy, that the metadata service request does not include the specified header information and, in response to the determination, may prevent the metadata service request from being passed to the metadata service.

In some examples, the specified header information may be stored in a user-agent field of the header. In some examples, the metadata proxy may be configured to store a list of acceptable user agents which, upon being identified in the user-agent field of the header, may be allowed to access metadata service information.

In some examples, the metadata proxy may send a null result to at least one application that sent a metadata service request after preventing the metadata service request from being passed to the metadata service. In some examples, the metadata service request may include a metadata service credential request that may be configured to request various metadata service credentials maintained by the metadata service.

In some examples, the metadata proxy may be booted in a manner that limits the network nodes from which the metadata service credentials are valid. In some examples, the metadata proxy may generate a sub-policy that specifies the network nodes from which the metadata service credentials are valid.

In some examples, the metadata proxy may be configured to assume a specified role, at boot, within the cloud environment. The metadata proxy may be configured to send a request to the metadata service to determine which role is being used by a server computer system that is hosting the metadata proxy. The metadata proxy may be configured to assume the role used by the server computer system that is hosting the metadata proxy.

In some examples, the metadata proxy may place various restrictions on credentials received from the metadata service. In some examples, the metadata proxy may provide the restricted credentials to at least one application that sent the intercepted metadata service request.

In some examples, the metadata service request may include a metadata service credential request that may be configured to request metadata service credentials maintained by the metadata service. In some examples, the metadata service credentials may be restricted to a specific web server identified by the metadata proxy. In some examples, the metadata service credentials may be restricted to a specific subnet within a computing network, where the specific subnet is identified by the metadata proxy.

In some examples, the metadata service credentials may be restricted to a specific computer networking environment, where the specific computer networking environment is identified by the metadata proxy. In some examples, the metadata proxy may be configured to prevent server-side request forgery (SSRF) by checking the intercepted requests for the specified header information. In some examples, the specified header information may be a custom value selected by a network administrator.

In addition, a corresponding system for protecting credentials in a cloud environment may include at least one physical processor and physical memory comprising computer-executable instructions that, when executed by the physical processor, cause the physical processor to establish a header policy that is to be applied at a metadata proxy. The header policy may indicate that specified header information is to be included in each metadata service request sent to a metadata service. The physical processor may also access the established header policy at the metadata proxy. The metadata proxy may be configured to intercept metadata service requests and check the intercepted requests for the specified header information. The physical processor may further determine, at the metadata proxy, that the metadata service request does not include the specified header information and, in response to the determination, may prevent the metadata service request from being passed to the metadata service.

In some examples, the above-described method may be encoded as computer-readable instructions on a computer-readable medium. For example, a computer-readable medium may include one or more computer-executable instructions that, when executed by at least one processor of a computing device, may cause the computing device to establish a header policy that is to be applied at a metadata proxy. The header policy may indicate that specified header information is to be included in each metadata service request sent to a metadata service. The processor of the computing device may also access the established header policy at the metadata proxy. The metadata proxy may be configured to intercept metadata service requests and check the intercepted requests for the specified header information. The processor of the computing device may further determine, at the metadata proxy, that the metadata service request does not include the specified header information and, in response to the determination, may prevent the metadata service request from being passed to the metadata service.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to protecting credentials in a cloud environment. As will be explained in greater detail below, embodiments of the present disclosure may establish a header policy for metadata service requests. Once the header policy has been established, a metadata proxy may analyze incoming metadata service requests and may allow or deny the requests based on whether those requests include specified header information. In some cases, these metadata service requests may be requests for information from a metadata service operated within a network. In other cases, these requests for resources may be application programming interface (API) calls from applications potentially hosted on an instance of a cloud (e.g., a virtual private cloud (VPC)). Regardless of which type of requests come in, the metadata proxy may analyze and filter these requests and may only allow those that include the information specified in the header policy.

In at least some traditional cloud-hosting systems, VPC providers may allow requests for resources to come from any location within a network and perhaps anywhere in the world. This may allow malicious users to potentially hijack metadata service requests directly or through API calls and use those requests to inject malicious code. In some cases, these metadata services may provide credential information to users or applications. These credentials may be used to access cloud resources including application data, database tables, or other private information. As such, it may be beneficial to filter requests for metadata service information based on which requests include the header information specified in the header policy. By preventing metadata service requests that lack the required header information, the metadata proxy may reduce the number of potentially malicious users/devices that have access to cloud systems and cloud-stored information. This may, in turn, keep legitimate user's data more secure and out of the hands of unwanted users.

Figure 1:
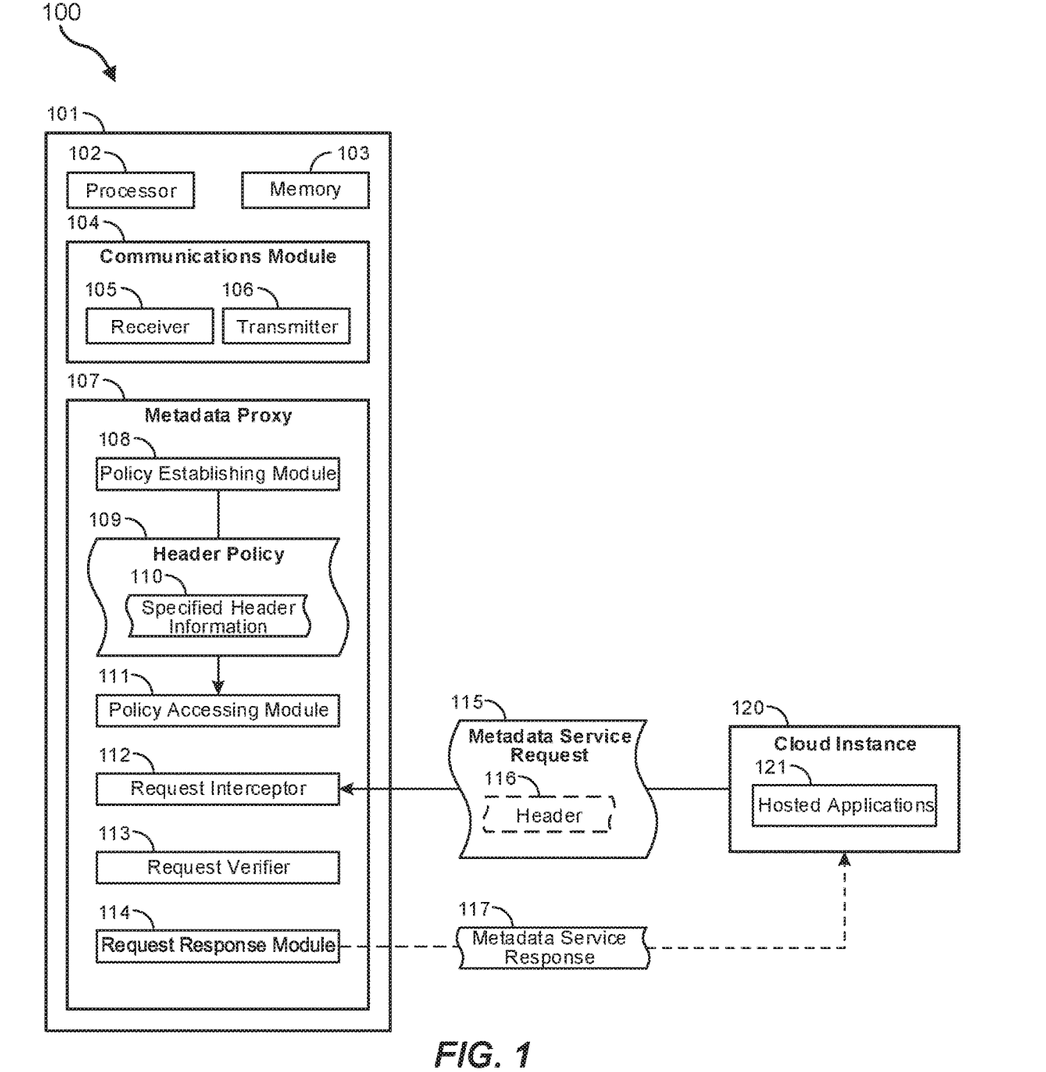
FIG. 1 illustrates a computing environment in which embodiments described herein may be implemented.

The following will provide, with reference to FIGS. 1-7, detailed descriptions of systems and methods for protecting credentials in a cloud environment. FIG. 1, for example, illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a metadata proxy 107 that is configured to perform various tasks including establishing a header policy, intercepting metadata service requests, checking those requests for the header information specified in the header policy, and allowing or preventing the request from reaching the metadata service. The metadata proxy 107 may include a policy establishing module 108, for example, which may be configured to generate a header policy 109 that is to apply to some or all of the requests that are sent to a metadata service. For example, as noted above, applications (e.g., application 121) or other users, devices, or entities may send requests to a metadata service. The metadata service may provide credentials, for example, that are used to access cloud resources. For example, application 121 hosted on cloud instance 120 may send a metadata service request 115 to a metadata service. The metadata proxy 107 may be configured to intercept such requests. Indeed, request interceptor 112 of computer system 101 may intercept metadata service request 115 and may check its header 116 for specific header information.

The policy establishing module 108 of metadata proxy 107 may identify one or more portions of header information 110 that are to be included when making metadata service requests. This header information 110 may be stored in header policy 109. The header policy 109 may apply to specific nodes within a network, nodes from certain locations, nodes associated with certain users, nodes associated with certain organizations, or may apply to any nodes sending metadata service requests. In some cases, the policy establishing module 108 may establish different header policies for different types of devices or for different times of day or for devices from certain locations or organizations, etc. Thus, administrators may have full control over when certain policies apply, or which policies are used when requests are received from certain devices or certain locations.

Upon receiving or intercepting a metadata service request (e.g., 115), the policy accessing module 111 may access the appropriate header policy (depending on which entity or which location, etc. the request was received from) and may implement the request verifier 113 of computer system 101 to verify that the request has the appropriate header information 110. If the metadata service request 115 lacks a header 116 or does not include the proper header information 110, the request response module 114 may deny the request and may prevent the request from reaching the metadata service. If, on the other hand, the metadata service request 115 does include the proper header information 110, the request response module 114 may allow the request to be passed on to the metadata service. The metadata service may then generate the response and provide it to the metadata proxy, which then forwards the response 117 to the hosted application (or other entity). This process will be described in greater detail below initially with regard to FIGS. 2-4 and then with regard to method 500 of FIG. 5A and FIGS. 6-7.

Figure 2:
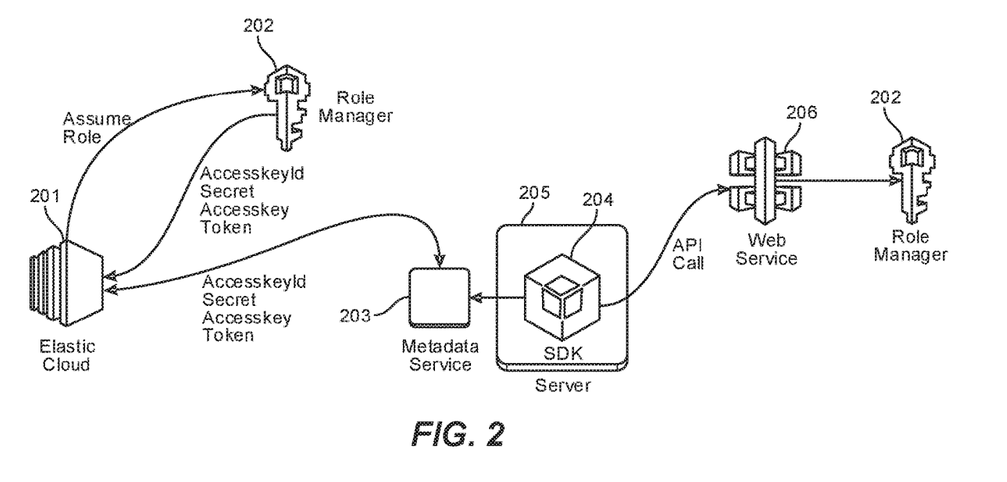
FIG. 2 illustrates a computing environment in which web services providers interact with a metadata service provider.

As shown in FIG. 2, various systems may be put into place to manage and distribute application credentials. As noted above, credential management systems may be designed to prevent credentials from being made available to unauthorized parties. The impact of exposed credentials may depend on the time of exposure, the skill of the individual with the credentials, and the privileges associated with the credentials. The combination of these can lead to anything from website defacement to a massive data breach where the businesses subjected to the breach may sustain heavy financial losses and may even be forced to discontinue business.

In the embodiments described herein, a "credential" may be any type of authentication data, token, or other indicator that is used to describe and/or make changes within an account (e.g., a web services account). In at least some of the embodiments herein, an entity (such as a user or business) may host one or more applications on the cloud. In FIG. 2, for example, these applications may be hosted on cloud server 205. These applications may need access to various cloud resources. Access to cloud resources may be controlled via metadata service 203 which may be designed to control access to network information and/or credentials. Some web service providers may provide the ability to assign permissions to a cloud instance through an identity and access management (IAM) role using a role manager 202. This role may be attached to a cloud server (e.g., 205) through an instance profile, thus providing credentials to the underlying applications running on the cloud instance through the metadata service 203.

The metadata service 203 may be a service provided by an entity that itself is configured to provide information for web services (e.g., 206) or applications deployed on cloud servers. As noted above, this metadata service information may include network information, cloud instance identifiers, credentials, or other information. In some cases, the metadata service information may be read-only and static. Each process with network access may be able to communicate with the metadata service by default. The metadata service 203 may include information indicating which availability-zone the user is deployed in, the user's private IP address, user data with which the user launched the cloud instance, and the web service credentials that the application uses for making API calls to the web service provider. These credentials may be temporary session credentials that range in a validity from one to six hours (or more).

When the expiration for the credentials nears, new session credentials may be generated and made available on the metadata service 203 for the application. This system may provide a substantially seamless experience with continuous access to web service APIs with limited-duration credentials. Software development kits (SDKs) 204 associated with the web service may be programmed to check the metadata service prior to credential expiration to retrieve the new set of dynamic credentials. The metadata service 203 may be accessible inside of the cloud server 205 using a specified IP address or other identifier.

In some cases, the web service provider may provide a logging service that logs API calls made by each application using credentials of a certain user or entity. This logging service may enable governance, compliance, and auditing. The logging service may identify which entity made the API call and from which location the API call was made. Static or dynamic credentials may be associated with a user in the web services identity access and management (IAM) service 202. The IAM service 202 may allow a user to generate up to two sets of credentials per IAM user. At least in some cases, these credentials may be static and may never expire. As such, the credentials may need to be manually rotated. Because these credentials may never expire, some entities may avoid the use of these credentials to mitigate risk if a credential were to be exposed.

Temporary or session-based credentials may be used when operating in the cloud. If a session-based credential is exposed, the potential impact of exposure may be reduced as the credential will eventually expire. Web service providers may associate session-based credentials with IAM roles. The lifecycle of credentials on cloud instances (e.g., 201) may be illustrated, at least partially, in FIG. 2. When a user launches a server 205 with an IAM role, the web service provider may create session credentials that are valid for a specified time period (e.g., 1-6 hours). The elastic cloud instance 201 may retrieve credentials for the metadata service 203 through an API call to a security token service (STS) that retrieves the temporary session credentials. These credentials may be passed on to the metadata service 203 that is relied upon by the cloud instance 201.

The web service SDK 204 may retrieve these credentials and use them when making API calls to web services 206. In the embodiments described herein, each API call may be evaluated by the IAM service (e.g., role manager 202) to determine if the role attached to the cloud server 205 has permission to make that call and if the temporary credential is still valid. If the role has permission and the token has not expired, the call may succeed. On the other hand, if the role does not have the permission or the token has expired, the call may fail. The cloud instance 201 may handle renewal of the credentials and may replace them in the metadata service 203.

In at least some embodiments, each temporary credential that is issued by the STS service may be given an expiration timestamp. When an API call is issued, the role manager 202 may validate that the credentials are still valid (not expired) and check the signature. If both validate, the API call may then be evaluated to see if the role has the given permissions assigned. As indicated further in FIG. 3, API calls may come from a variety of locations. In the embodiments described herein, the location from which the API call originated may be evaluated and used as a basis for allowing or denying the request.

Figure 3:
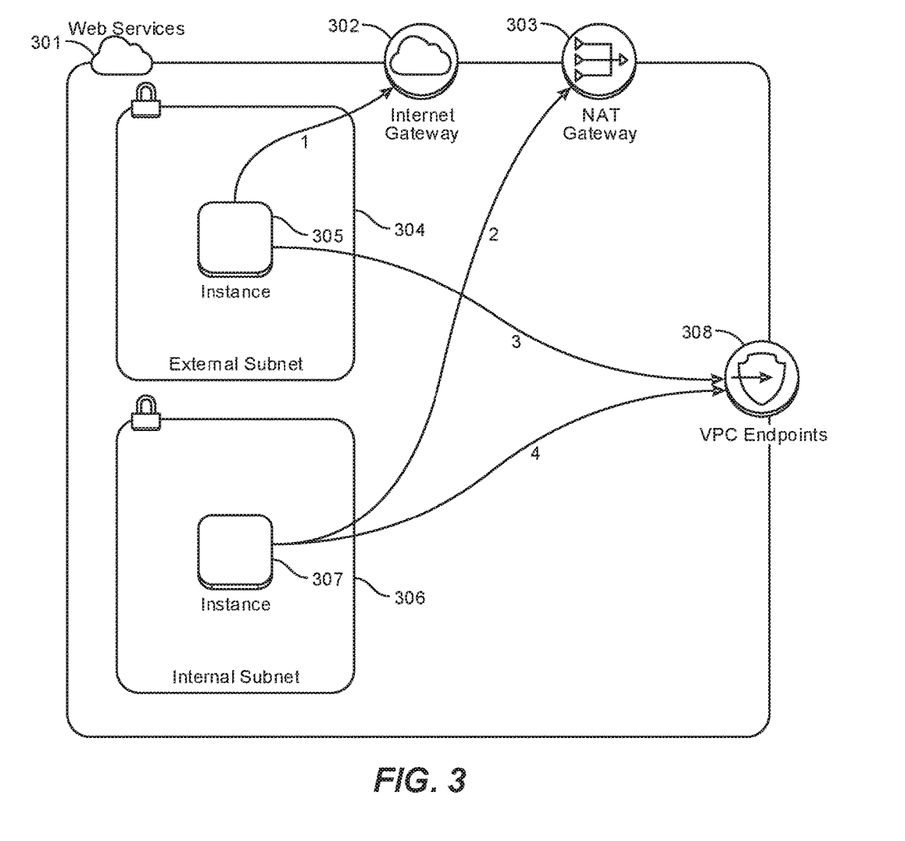
FIG. 3 illustrates a computing environment in which internal and external subnets within a network interact with a virtual private cloud (VPC).

FIG. 3 illustrates a networking environment in which API calls may originate from a variety of locations. At arrow 1, web services 301 may observe the public IP address of a user's cloud instance (e.g., 305) as the source IP address if the web services instance 305 instance is deployed in an external subnet (e.g., in a public network with a public IP address). This is because, at least in this embodiment, web services API calls may go directly to the internet 302. At arrow 2, web services 301 may observe the network address translation (NAT) gateway 303 public IP address as the source IP address. In such cases, a user's web services instance 307 may be deployed in an internal subnet 306 (e.g., a private network with no public IP address). This is because, at least in this embodiment, web services API calls may travel through the NAT Gateway 303 in order to get to a virtual private cloud (VPC) endpoint 308.

At arrow 3, web services 301 3 may observe the private IP address of a user's cloud instance as the source IP address and may also observe information about the VPC and/or VPC endpoint 308 the call went through if the user's web service instance 305 deployed in an external subnet 304 (e.g., a public network with a public IP address) makes a web services API call that goes through a VPC endpoint 308 or Private Link. At arrow 4, web services 301 may observe the private IP address of a user's cloud instance 307 as the source IP address as well as information about the VPC and/or VPC endpoint 308 the call went through if the user's web services cloud instance 307 deployed in an internal subnet 306 (e.g., a private network with no public IP address) makes a web services API call that goes through a VPC endpoint 308 or private link. Accordingly, in each of these four scenarios, the "location" of where an API call or metadata service request originates may be determined in a different manner.

As noted above, in at least some of the embodiments described herein, credentials may be enforced by only allowing API calls or other metadata service information requests to succeed if they originate from a known environment. In a web services environment, this may be achieved by creating an IAM policy that checks the origin of the API call. The systems described herein may be designed to create a managed or inline policy that encompasses a user's entire account across all regions. To do this, the user would describe each region and collect NAT gateway IPs, VPC identifiers, and VPC endpoint IDs to create the policy language for the managed policy. These endpoints may then be attached to IAM Roles that are to be protected. In some embodiments, the user's web service may be exposed publicly through a load balancer. This may allow the user to deploy their cloud instance into the internal subnet and allow the user to attach this policy to their IAM role.

Figure 4:
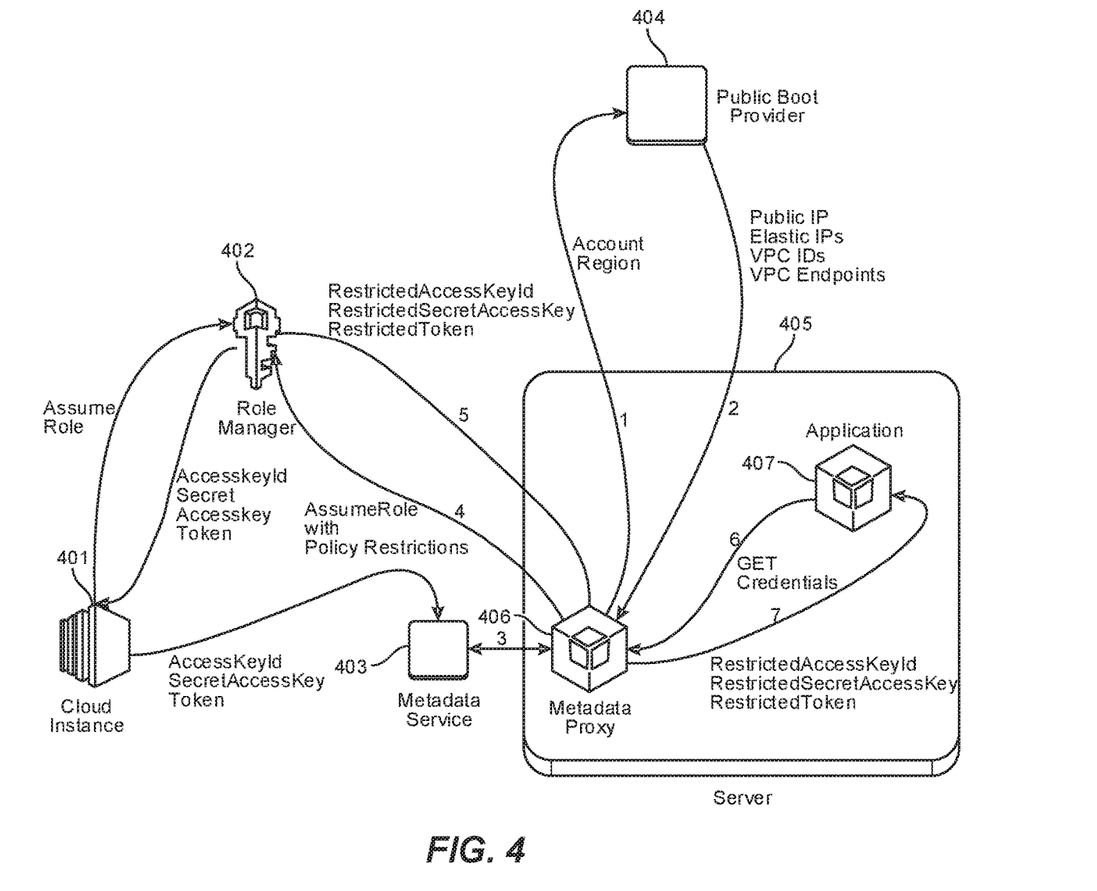
FIG. 4 illustrates a computing environment in which a metadata proxy interacts with a metadata service, a public boot provider, and other network nodes.

FIG. 4 describes an embodiment that provides credential enforcement by both locking credentials to an environment or location and using a metadata proxy to prevent credential compromise via a vulnerability class (e.g., Server-Side Request Forgery (SSRF)). In at least some embodiments, the computing architecture of FIG. 4 may be implemented to restrict credentials to a server or environment (e.g., a subnet) that can be applied to some or all cloud computing infrastructure. The embodiments described herein may provide a metadata proxy and service to applications running on a server (e.g., a web server or application server). The metadata proxy may interact with the server and, in the event that a credential is exposed or otherwise compromised, the credentials may be unable to work properly.

The diagram of FIG. 4 illustrates a boot process in which restricted credentials may be generated and promulgated. At step 1 in FIG. 4, the metadata proxy 406 may boot and request boot information from a public boot provider 404. The public boot provider 404 may send information about where the server 405 is deployed. For example, the information may include an account identifier (ID) and region associated with the server 405. Information such as cloud instance ID or other metadata on the server may be optionally sent as well. At step 2, the public boot provider 404 may respond with the public internet protocol (IP) address identified in the request as well as information relating to the environment in which the server 405 is deployed. This information may be regional or global to the account or entity. This process may contain the public IP address of the server requesting the information, virtual private cloud (VPC) IDs for the region or entity, VPC endpoint IDs for the region or entity, and/or potentially elastic IPs (static IPs assigned to the account that might be used by running services).

At step 3 in FIG. 4, the metadata proxy 406 may communicate with the metadata service 403 to determine which role the server is currently using (e.g., as prescribed by the role manager 402). At step 4, the metadata proxy 406 may perform an "assume role" operation for the role that was identified in step 3. When the "assume role" operation is called, the metadata proxy 406 may use the information from the public boot provider 404 to restrict where the credentials are valid. At step 5, the role manager 402 may provide the restricted credentials back to the metadata proxy 406 to provide to requesting applications 407 on the server 405. At step 6, the applications 407 on the server 405 may use a software development kit (SDK) or custom code to communicate with the metadata proxy 406 to request credentials. At step 7, the metadata proxy 406 may provide the restricted credentials back to the application(s) 407 so that the applications may access resources provided by the cloud instance 401. These steps may implement a trust relationship that defines which service, user, or role can perform an "assume role" operation for the currently used role as assigned by the role manager 402. In order to have the metadata proxy 406 protect the role deployed on the server 405, at least in some embodiments, the trust relationship may be updated to allow the role to perform an "assume role" operation into itself.

When the metadata proxy 406 performs an "assume role" operation to create restricted credentials to serve to applications, the metadata proxy may inject a sub-policy that restricts which locations (either physical or logical) the credentials are valid from. The sub-policy may include a restriction where any actions are denied when the conditions are not met. The sub-policy may also include a statement that allows all actions. When doing sub-policy injection, the metadata proxy may be provided with a scoped subset of what the server's assigned role already has. In some cases, by default, some or all original permissions that the role has may be assumed. The sub-policy may also include a denying statement that denies the action of the "assume role" operation to the cloud instance role. As such, only the metadata proxy may be able to assume the role that the server is running as. At least in some cases, if this denying statement is not provided, another user may use the credentials to perform an "assume role" operation to the same role without sub-policy injection and remove the restrictions. With this sub-policy, the metadata proxy 406 may create credentials that are restricted to the environment described by the policy. This may result in credentials that are restricted to a single cloud instance (if deployed in an external subnet, talking directly to the internet), or may be restricted to the internal subnet or availability-zone where routing to the internet goes through a NAT Gateway.

Combining the idea of credential enforcement and restriction and implementation of a metadata proxy may result in highly granular levels of control regarding where credentials are valid in a given network environment. Moreover, the credential enforcement and metadata proxy may limit where the credentials may be used (i.e., to a single running cloud instance). If a credential exposure or compromise ever occurs, the credentials may be invalid outside of the running cloud instance. This method may mitigate credential theft vulnerabilities and may reduce the ability of attackers to utilize stolen credentials without fully compromising a cloud instance.

Figure 5A:
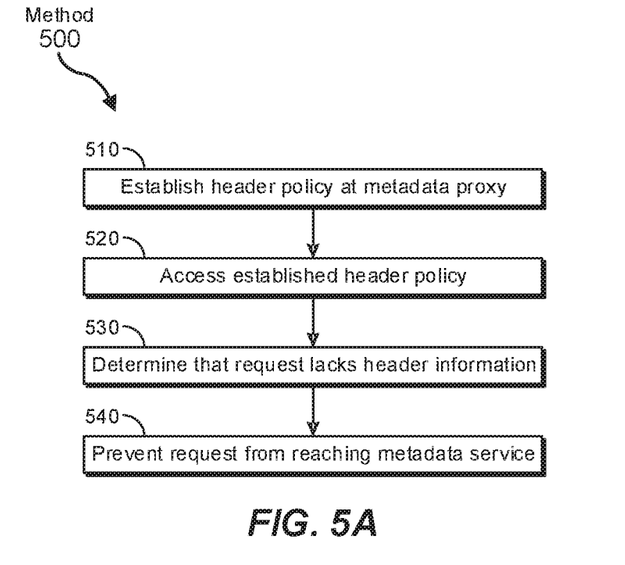
FIG. 5A illustrates a flow diagram of an exemplary method for protecting credentials in a cloud environment.
Figure 5B:
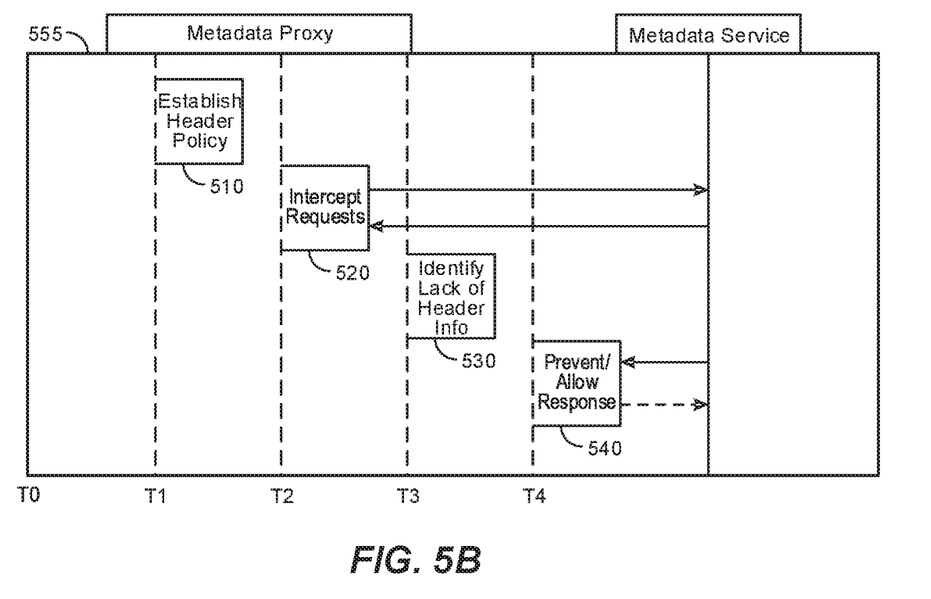
FIG. 5B illustrates a timing diagram that corresponds to the flow diagram of FIG. 5A.

Turning now to FIGS. 5A and 5B, flow diagrams and timing diagrams are provided of an exemplary computer-implemented method 500 for protecting credentials in a cloud environment. The steps shown in FIG. 5A may be performed by any suitable computer-executable code and/or computing system, including the system illustrated in FIG. 1. In one example, each of the steps shown in FIG. 5A may represent an algorithm whose structure includes and/or is represented by multiple sub-steps, examples of which will be provided in greater detail below.

As illustrated in method 500 of FIG. 5A, one or more of the systems described herein may be implemented to protect credentials in a cloud environment. For example, at step 510 (time T1 of timing diagram 555 in FIG. 5B), the policy establishing module 108 of FIG. 1 may establish a header policy 109 that is to be applied at a metadata proxy (e.g., 107). The header policy may indicate one or more portions of specified header information 110 that indicates which types of header information may be required on metadata service request headers. At step 520 (time T2), the policy accessing module 111 of metadata proxy 107 may access the established header policy 109. The metadata proxy 107 may be configured to intercept metadata service requests and check the intercepted requests for the specified header information. For instance, the request interceptor 112 of metadata proxy 107 may intercept metadata service request 115 after it is sent from an application (e.g., 121) or sent from some other source. The request verifier 113 of metadata proxy 107 may verify that the metadata service request 115 has a header 116 and that the header includes some or all of the specified header information 110 indicated in the header policy 109.

If the request verifier 113 of metadata proxy 107 determines, at step 530 (time T3), that the metadata service request 115 does not include the specified header information 110, the request response module 114 of metadata proxy 107 may prevent the metadata service request 115 from being passed to the metadata service (e.g., 403 of FIG. 4) at step 540 (time T4). If, on the other hand, the request verifier 113 of metadata proxy 107 determines that the metadata service request 115 does include the specified header information 110, the request response module 114 of metadata proxy 107 may pass the metadata service request 115 to the metadata service 403.

Figure 6:
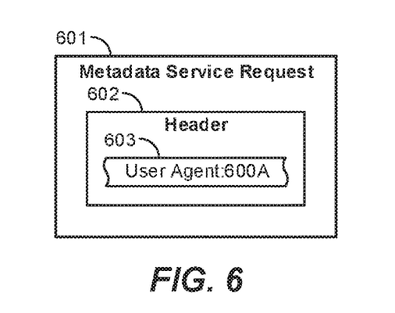
FIG. 6 illustrates an embodiment of a metadata service request including associated header information.

In some embodiments, the specified header information 110 may be stored in a user-agent field of the header. For example, as shown in FIG. 6, a metadata service request 601 may include a header 602 and information in the user-agent field 603. In this case, the information in the user-agent field 603 identifies user agent 600A. In some embodiments, the header may include many user-agent fields and, in some cases, the header may include a single user-agent field with multiple different identified user agents. Indeed, the header 602 may include substantially any number of fields and/or entities or items identified in those fields. The metadata proxy (e.g., 107 of FIG. 1) may be configured to store a list of acceptable user agents. User agent 600A may be one of those acceptable agents. As such, if the metadata proxy 107 identifies the user agent as being one of the one or more acceptable user agents, the metadata service request 601 may be allowed to access metadata service information.

In some cases, if the metadata proxy 107 determines that the header 602 does not include the proper header information 110 as indicated in the header policy 109, the metadata proxy may send a null result to the application or other entity that sent the metadata service request. Thus, after preventing the metadata service request from being passed to the metadata service at step 540 of FIG. 5A, the metadata proxy 107 may optionally send a null response in the metadata service response 117. Thus, in such cases, the requesting application or entity may be apprised that the request was denied. In other cases, no response may be sent and the application may simply not receive the requested metadata service information. The metadata service request sent by the application may be requesting credentials that would allow the application 121 to access cloud resources including data stored in a cloud data store, networking resources, or other cloud resources. These credentials may be maintained by the metadata service and may be provided to the application 121 or other requesting entity by the metadata proxy 107 if the metadata service request 115 includes the proper header 116 and header information 111.

Figure 7:
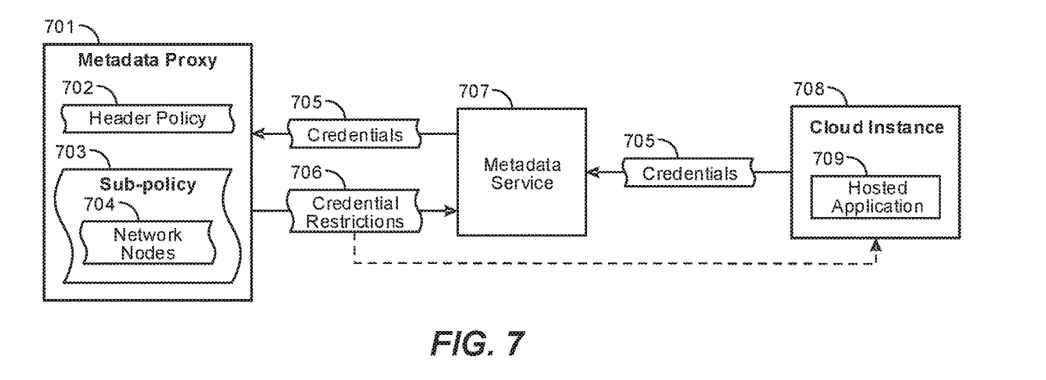
FIG. 7 illustrates an embodiment in which a metadata proxy interacts with a metadata service and one or more applications hosted on a cloud instance.

In some embodiments, the metadata proxy may be booted in a manner that limits the network nodes from which the metadata service credentials are valid. During this boot process, the metadata proxy may generate a sub-policy that specifies the network nodes from which the metadata service credentials are valid. For example, as shown in FIG. 7, the metadata proxy 701 (which may be the same as or different than metadata proxy 107 of FIG. 1) may generate a header policy 702. The header policy 702 may specify which header information is to be included in metadata service requests. The metadata proxy 701 may also create a sub-policy 703 that specifies the network nodes 704 from which the metadata service credentials are valid.

In some cases, the metadata proxy 701 may place restrictions on credentials received from metadata service 707. For instance, the metadata proxy 701 may place restrictions on credentials 705 received from metadata service 707. The restrictions may place limits on the network nodes 704 from which the credentials are valid. For instance, if the network included many hundreds or thousands of nodes, the sub-policy 703 may indicate that certain specified nodes are permitted to use the credentials 705 while other nodes are not. In other embodiments, the sub-policy 703 may specify certain physical or logical locations (e.g., behind a specified firewall or behind a specified gateway) from which the credentials 705 may be valid. These restrictions or, more specifically, the restricted credentials themselves (706), may be passed by the metadata proxy 701 back to the metadata service 707 or back to the hosted application 709 that is hosted on cloud instance 708. Then, if the restricted credentials 706 are approved (i.e., the hosted application 709 is associated with an approved network node 704), then the application may have access to the requested cloud resources.

In some embodiments, the metadata proxy 701 may be configured to assume a specified role, at boot, within the cloud environment. The metadata proxy 701 may be configured, for example, to send a request to the metadata service 707 to determine which role is being used by the server computer system (e.g., 405 of FIG. 4 or 708 of FIG. 7) that is hosting the metadata proxy 701. The server may assume many different roles within a given computer networking environment. Upon determining which role the server is currently running under, the metadata proxy 701 may be configured to assume the role used by the server that is hosting the metadata proxy. In some cases, the metadata proxy 701 may do this by performing an "assume role" operation, as explained above. By assuming the role of the server, the metadata proxy 701 may then have the appropriate rights, privileges, or authority to place restrictions on the credentials 705. Thus, in this manner, the metadata proxy 701 may access credentials from a metadata service 707 and limit the network nodes from which the credentials 705 will be valid. This, in turn, may limit exposure from outside (potentially malicious) users using the credentials to access cloud resources to which they should not be able to access.

In some cases, the metadata service credentials 705 may be restricted to a specific web server (e.g., 708) identified by the metadata proxy 701. In some embodiments, that server is hosting the metadata proxy 701. The restrictions 706 applied to the credentials may limit the functionality of the credentials to a specific subnet within a computing network. This subnet may be identified by the metadata proxy 701 in header policy 702. In other cases, the metadata service credentials 705 may be restricted to a specific computer networking environment. This computer networking environment may be identified by the metadata proxy 701 in the header policy 702.

Still further, in one example, the metadata proxy 701 may be configured to prevent server-side request forgery (SSRF). The metadata proxy 701 may prevent SSRF by checking the intercepted requests for the specified header information. In at least some embodiments, when malicious users attempt a server-side request forgery, those users typically will not have the ability to set which HTTP headers are sent in the request and may not even have the ability to include headers in the forged request. Thus, as a first line of defense, the malicious user may not know that a header is required in metadata service requests. Secondly, even if the malicious user does know that HTTP headers are required, he/she may not know which information needs to be included in the headers (e.g., specified header information 110). Thus, administrators or other users may set specified user-agent values or may set other custom values which are to be included in metadata service requests. Then, when the metadata proxy looks for those user-agent values or other custom values and doesn't find them, the service request may be denied and the credentials may remain secure. In this manner, SSRF and other attack vectors may be nullified or at least significantly reduced within a network.

In addition, a corresponding system for protecting credentials in a cloud environment may include at least one physical processor and physical memory comprising computer-executable instructions that, when executed by the physical processor, cause the physical processor to establish a header policy that is to be applied at a metadata proxy. The header policy may indicate that specified header information is to be included in each metadata service request sent to a metadata service. The physical processor may also access the established header policy at the metadata proxy, where the metadata proxy is configured to intercept metadata service requests and check the intercepted requests for the specified header information. The physical processor may further determine, at the metadata proxy, that the metadata service request does not include the specified header information and, in response to the determination, may prevent the metadata service request from being passed to the metadata service.

In some examples, the above-described method may be encoded as computer-readable instructions on a computer-readable medium. For example, a computer-readable medium may include one or more computer-executable instructions that, when executed by at least one processor of a computing device, may cause the computing device to establish a header policy that is to be applied at a metadata proxy. The header policy may indicate that specified header information is to be included in each metadata service request sent to a metadata service. The processor of the computing device may also access the established header policy at the metadata proxy, where the metadata proxy is configured to intercept metadata service requests and check the intercepted requests for the specified header information. The processor of the computing device may further determine, at the metadata proxy, that the metadata service request does not include the specified header information and, in response to the determination, may prevent the metadata service request from being passed to the metadata service Thus, in this manner, systems and methods may be provided for protecting credentials in a computer networking environment. These systems may establish a metadata proxy that intercepts and checks metadata service requests for certain header information. If those requests do not include the appropriate header information, the metadata service requests may be denied. Moreover, the metadata proxy may be configured to boot in a specified mode and assume the role of a given server in order to place restrictions on which network nodes credentials can be received from. Placing these types of restrictions on where credentials can be used may be an added layer of protection that limits the use of compromised credentials within a computing network.

1. A computer-implemented method for protecting credentials in a cloud environment, comprising: establishing a header policy that is to be applied at a metadata proxy, the header policy indicating that specified header information is to be included in each metadata service request sent to a metadata service; accessing the established header policy at the metadata proxy, the metadata proxy being configured to intercept metadata service requests and check the intercepted requests for the specified header information; determining, at the metadata proxy, that the metadata service request does not include the specified header information; and in response to the determination, preventing the metadata service request from being passed to the metadata service.

2. The computer-implemented method of claim 1, wherein the specified header information is stored in a user-agent field of the header.

3. The computer-implemented method of claim 2, wherein the metadata proxy is configured to store a list of acceptable user agents which, upon being identified in the user-agent field of the header, are allowed to access metadata service information.

4. The computer-implemented method of claim 1, further comprising the metadata proxy sending a null result to at least one application that sent the metadata service request after preventing the metadata service request from being passed to the metadata service.

5. The computer-implemented method of claim 1, wherein the metadata service request comprises a metadata service credential request that is configured to request one or more metadata service credentials maintained by the metadata service.

6. The computer-implemented method of claim 5, wherein the metadata proxy is booted in a manner that limits the network nodes from which the metadata service credentials are valid.

7. The computer-implemented method of claim 6, wherein the metadata proxy generates a sub-policy that specifies the network nodes from which the metadata service credentials are valid.

8. The computer-implemented method of claim 6, wherein the metadata proxy is configured to assume a specified role, at boot, within the cloud environment.

9. The computer-implemented method of claim 8, wherein the metadata proxy is configured to send a request to the metadata service to determine which role is being used by a server computer system that is hosting the metadata proxy.

10. The computer-implemented method of claim 9, wherein the metadata proxy is configured to assume the role used by the server computer system that is hosting the metadata proxy.

11. The computer-implemented method of claim 10, wherein the metadata proxy places one or more restrictions on credentials received from the metadata service.

12. The computer-implemented method of claim 11, wherein the metadata proxy provides the restricted credentials to at least one application that sent the intercepted metadata service request.

13. A system comprising: at least one physical processor; and physical memory comprising computer-executable instructions that, when executed by the physical processor, cause the physical processor to: establish a header policy that is to be applied at a metadata proxy, the header policy indicating that specified header information is to be included in each metadata service request sent to a metadata service access the established header policy at the metadata proxy, the metadata proxy being configured to intercept metadata service requests and check the intercepted requests for the specified header information; determine, at the metadata proxy, that the metadata service request does not include the specified header information; and in response to the determination, prevent the metadata service request from being passed to the metadata service.

14. The system of claim 13, wherein the metadata service request comprises a metadata service credential request that is configured to request one or more metadata service credentials maintained by the metadata service.

15. The system of claim 14, wherein the metadata service credentials are restricted to a specific web server identified by the metadata proxy.

16. The system of claim 14, wherein the metadata service credentials are restricted to a specific subnet within a computing network, the specific subnet being identified by the metadata proxy.

17. The system of claim 14, wherein the metadata service credentials are restricted to a specific computer networking environment, the specific computer networking environment being identified by the metadata proxy.

18. The system of claim 13, wherein the metadata proxy is configured to prevent server-side request forgery (SSRF) by checking the intercepted requests for the specified header information.

19. The system of claim 13, wherein the specified header information comprises a custom value selected by a network administrator.

20. A non-transitory computer-readable medium comprising one or more computer-executable instructions that, when executed by at least one processor of a computing device, cause the computing device to: establish a header policy that is to be applied at a metadata proxy, the header policy indicating that specified header information is to be included in each metadata service request sent to a metadata service; access the established header policy at the metadata proxy, the metadata proxy being configured to intercept metadata service requests and check the intercepted requests for the specified header information; determine, at the metadata proxy, that the metadata service request does not include the specified header information; and in response to the determination, prevent the metadata service request from being passed to the metadata service.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data requests to be transformed, transform the data requests, output a result of the transformation to determine an origin for the requests, use the result of the transformation to allow or prevent access to resources, and store the result of the transformation to make further determinations. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. A computer-implemented method for protecting credentials in a cloud environment, comprising:
    establishing a header policy that is to be applied at a metadata proxy, the header policy indicating that specified header information is to be included in each metadata service request sent to a metadata service;
    accessing the established header policy at the metadata proxy, the metadata proxy being configured to intercept metadata service requests and check the intercepted requests for the specified header information;
    generating a sub-policy that is to be applied in addition to the established header policy, wherein generating the sub-policy includes determining a physical location or a logical location from which metadata service credentials granted upon compliance with the established header policy are valid, and wherein the manner in which the specified physical or logical location is determined is variable based on where the metadata service request originated;
    injecting, by the metadata proxy, the generated sub-policy that is to be applied in addition to the established header policy;
    determining, at the metadata proxy, that the metadata service request does not include the specified header information; and
    in response to the determination, preventing the metadata service request from being passed to the metadata service.

2. The computer-implemented method of claim 1, wherein the specified header information is stored in a user-agent field of the header.

3. The computer-implemented method of claim 2, wherein the metadata proxy is configured to store a list of acceptable user agents which, upon being identified in the user-agent field of the header, are allowed to access metadata service information.

4. The computer-implemented method of claim 1, further comprising the metadata proxy sending a null result to at least one application that sent the metadata service request after preventing the metadata service request from being passed to the metadata service.

5. The computer-implemented method of claim 1, wherein the metadata service request comprises a metadata service credential request that is configured to request one or more metadata service credentials maintained by the metadata service.

6. The computer-implemented method of claim 5, wherein the metadata proxy is booted in a manner that limits the network nodes from which the metadata service credentials are valid.

7. The computer-implemented method of claim 6, wherein the metadata proxy generates a sub-policy that specifies the network nodes from which the metadata service credentials are valid.

8. The computer-implemented method of claim 6, wherein the metadata proxy is configured to assume a specified role, at boot, within the cloud environment.

9. The computer-implemented method of claim 8, wherein the metadata proxy is configured to send a request to the metadata service to determine which role is being used by a server computer system that is hosting the metadata proxy.

10. The computer-implemented method of claim 9, wherein the metadata proxy is configured to assume the role used by the server computer system that is hosting the metadata proxy.

11. The computer-implemented method of claim 10, wherein the metadata proxy places one or more restrictions on credentials received from the metadata service.

12. The computer-implemented method of claim 11, wherein the metadata proxy provides the restricted credentials to at least one application that sent the intercepted metadata service request.

13. A system comprising:
at least one physical processor; and
physical memory comprising computer-executable instructions that, when executed by the physical processor, cause the physical processor to:
establish a header policy that is to be applied at a metadata proxy, the header policy indicating that specified header information is to be included in each metadata service request sent to a metadata service;
access the established header policy at the metadata proxy, the metadata proxy being configured to intercept metadata service requests and check the intercepted requests for the specified header information;
generate a sub-policy that is to be applied in addition to the established header policy, wherein generating the sub-policy includes determining a physical location or a logical location from which metadata service credentials granted upon compliance with the established header policy are valid, and wherein the manner in which the specified physical or logical location is determined is variable based on where the metadata service request originated;
inject, by the metadata proxy, the generated sub-policy that is to be applied in addition to the established header policy;
determine, at the metadata proxy, that the metadata service request does not include the specified header information; and
in response to the determination, prevent the metadata service request from being passed to the metadata service.

14. The system of claim 13, wherein the metadata service request comprises a metadata service credential request that is configured to request one or more metadata service credentials maintained by the metadata service.

15. The system of claim 14, wherein the metadata service credentials are restricted to a specific web server identified by the metadata proxy.

16. The system of claim 14, wherein the metadata service credentials are restricted to a specific subnet within a computing network, the specific subnet being identified by the metadata proxy.

17. The system of claim 14, wherein the metadata service credentials are restricted to a specific computer networking environment, the specific computer networking environment being identified by the metadata proxy.

18. The system of claim 13, wherein the metadata proxy is configured to prevent server-side request forgery (SSRF) by checking the intercepted requests for the specified header information.

19. The system of claim 13, wherein the specified header information comprises a custom value selected by a network administrator.

20. A non-transitory computer-readable medium comprising one or more computer-executable instructions that, when executed by at least one processor of a computing device, cause the computing device to:
establish a header policy that is to be applied at a metadata proxy, the header policy indicating that specified header information is to be included in each metadata service request sent to a metadata service;
access the established header policy at the metadata proxy, the metadata proxy being configured to intercept metadata service requests and check the intercepted requests for the specified header information;
generate a sub-policy that is to be applied in addition to the established header policy, wherein generating the sub-policy includes determining a physical location or a logical location from which metadata service credentials granted upon compliance with the established header policy are valid, and wherein the manner in which the specified physical or logical location is determined is variable based on where the metadata service request originated;
inject, by the metadata proxy, the generated sub-policy that is to be applied in addition to the established header policy;
determine, at the metadata proxy, that the metadata service request does not include the specified header information; and
in response to the determination, prevent the metadata service request from being passed to the metadata service.

* * * * *